(12) United States Patent
Lobbes et al.

(10) Patent No.: US 10,929,878 B2
(45) Date of Patent: Feb. 23, 2021

(54) TARGETED CONTENT IDENTIFICATION AND TRACING

(71) Applicant: International Business Machines Corporation, Armonk, NY (US)

(72) Inventors: Matthew M. Lobbes, Northlake, TX (US); Brian J. Snitzer, Lancaster, PA (US); Nathaniel J. Gibbs, Iowa City, IA (US); Shelbee Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 16/165,209

(22) Filed: Oct. 19, 2018

(65) Prior Publication Data

US 2020/0126115 A1 Apr. 23, 2020

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0251* (2013.01)

(58) Field of Classification Search
CPC .............. G06Q 30/0246; G06Q 30/0251
USPC ................................................. 705/14.45
See application file for complete search history.

(56) References Cited

U.S. PATENT DOCUMENTS

| 6,072,520 | A  | * | 6/2000  | Yuen ............... G11B 27/107 348/569 |
| 6,112,186 | A  | * | 8/2000  | Bergh .............. G06Q 30/02 705/7.32 |
| 6,115,057 | A  | * | 9/2000  | Kwoh ............. H04N 7/0887 725/28 |
| 6,125,395 | A  | * | 9/2000  | Rosenberg ...... G06F 16/954 709/228 |
| 6,226,793 | B1 | * | 5/2001  | Kwoh .............. H04N 21/84 725/28 |
| 6,388,700 | B1 | * | 5/2002  | Beyers ........... H04N 21/4751 348/571 |
| 6,662,365 | B1 | * | 12/2003 | Sullivan ........ H04N 5/44543 725/25 |

(Continued)

OTHER PUBLICATIONS 101 references (1974-2013).*

(Continued)

*Primary Examiner* — Gautam Ubale
*Assistant Examiner* — Michael I Ezewoko
(74) *Attorney, Agent, or Firm* — Schmeiser, Olsen & Watts, LLP; Michael O'Keefe

(57) ABSTRACT

A method of identifying targeted content includes deploying a plurality of internet bots configured to interact with content sources using predetermined patterns and profiles, wherein each individual internet bot of the plurality of internet bots includes at least one characteristic that is unique relative to the rest of the plurality of internet bots, collecting cause and effect data related to cause and effect of user interactions with content sources, receiving the cause and effect data collected by the plurality of internet bots, correlating user interactions with content sources using the cause and effect data collected by the plurality of internet bots, and identifying, how content is targeted to users by content sources from the correlating.

20 Claims, 7 Drawing Sheets

(56) References Cited

U.S. PATENT DOCUMENTS

| | | | | |
|---|---|---|---|---|
| 6,684,240 B1* | 1/2004 | Goddard | H04N 7/163 | 348/E7.061 |
| 7,089,576 B1* | 8/2006 | Lynch | H04N 7/165 | 348/E7.063 |
| 7,210,158 B1* | 4/2007 | Forler | H04N 7/163 | 725/31 |
| 7,313,803 B1* | 12/2007 | Lynch | H04N 7/163 | 348/E7.061 |
| 7,430,360 B2* | 9/2008 | Abecassis | H04N 21/4753 | 386/343 |
| 7,739,706 B2* | 6/2010 | Gonzales-Caiazzo | H04N 5/44513 | 725/25 |
| 7,950,032 B1* | 5/2011 | Lynch | H04N 21/454 | 725/28 |
| 8,225,345 B2* | 7/2012 | Sahasrabudhe | H04N 21/443 | 725/30 |
| 8,244,752 B2* | 8/2012 | Buehrer | H04L 47/10 | 707/769 |
| 8,370,475 B1* | 2/2013 | Harvey | H04L 67/20 | 709/223 |
| 8,397,284 B2* | 3/2013 | Kommareddy | H04L 63/1458 | 726/13 |
| 8,402,543 B1* | 3/2013 | Ranjan | H04L 63/1416 | 726/23 |
| 8,495,679 B2* | 7/2013 | Labeeb | H04N 7/163 | 725/46 |
| 8,533,819 B2* | 9/2013 | Hoeflin | H04L 63/1416 | 726/22 |
| 8,655,907 B2* | 2/2014 | Hsiao | G06Q 30/0241 | 707/769 |
| 8,682,812 B1* | 3/2014 | Ranjan | H04L 63/1425 | 706/12 |
| 8,762,298 B1* | 6/2014 | Ranjan | H04L 63/14 | 706/12 |
| 8,768,766 B2* | 7/2014 | Ellis | G06Q 30/0242 | 705/14.43 |
| 8,813,236 B1* | 8/2014 | Saha | H04L 63/1408 | 726/25 |
| 8,819,807 B2* | 8/2014 | Paek | H04L 63/1408 | 726/13 |
| 8,826,444 B1* | 9/2014 | Kalle | G06F 21/552 | 726/26 |
| 8,850,469 B1* | 9/2014 | Yang | H04N 21/8549 | 725/28 |
| 8,898,482 B2* | 11/2014 | Templin | G06F 21/606 | 713/193 |
| 8,898,808 B1* | 11/2014 | Kittrell | H04L 67/22 | 726/30 |
| 8,904,530 B2* | 12/2014 | Liu | H04L 63/1416 | 726/23 |
| 8,966,625 B1* | 2/2015 | Zuk | G06F 21/57 | 726/22 |
| 8,972,376 B1* | 3/2015 | Gailis | G06F 16/951 | 707/710 |
| 8,990,298 B1* | 3/2015 | Anderson | H04L 69/329 | 709/203 |
| 9,171,151 B2* | 10/2015 | Behrendt | H04L 63/0227 | |
| 9,270,693 B2* | 2/2016 | Kraitsman | H04L 63/1425 | |
| 9,300,683 B2* | 3/2016 | Rapaport | H04L 63/126 | |
| 9,324,085 B2* | 4/2016 | Collet | G06Q 30/02 | |
| 9,361,631 B2* | 6/2016 | Meyer | G06Q 30/0256 | |
| 9,386,028 B2* | 7/2016 | Altman | G06F 21/554 | |
| 9,386,165 B2* | 7/2016 | Raleigh | G06Q 30/016 | |
| 9,401,965 B2* | 7/2016 | Mysen | H04L 67/22 | |
| 9,443,019 B2* | 9/2016 | Gailis | G06F 16/951 | |
| 9,467,461 B2* | 10/2016 | Balderas | H04L 63/1441 | |
| 9,473,528 B2* | 10/2016 | Zuk | H04L 63/1408 | |
| 9,514,446 B1* | 12/2016 | Rajkumar | H04L 9/0861 | |
| 9,531,736 B1* | 12/2016 | Torres | H04L 63/1441 | |
| 9,537,864 B2* | 1/2017 | Templin | H04L 63/0428 | |
| 9,641,550 B2* | 5/2017 | Kraitsman | H04L 63/1408 | |
| 9,680,850 B2* | 6/2017 | Rapaport | H04L 63/126 | |
| 9,705,895 B1* | 7/2017 | Gutzmann | G06F 21/57 | |
| 9,792,378 B2* | 10/2017 | Grunick | G06F 16/29 | |
| 9,805,389 B2* | 10/2017 | Radziwonczyk-Syta | H04L 65/60 | |
| 9,807,092 B1* | 10/2017 | Gutzmann | H04L 63/10 | |
| 9,912,680 B2* | 3/2018 | Torres | H04L 67/10 | |
| 10,009,361 B2* | 6/2018 | Turnbull | G06F 21/55 | |
| 10,025,952 B1* | 7/2018 | Wang | G06F 21/6245 | |
| 10,084,866 B1* | 9/2018 | Yamanoha | H04L 67/16 | |
| 10,095,866 B2* | 10/2018 | Gong | H04L 63/1416 | |
| 10,110,633 B2* | 10/2018 | Laoutaris | H04W 12/02 | |
| 10,122,807 B2* | 11/2018 | Yang | G06F 16/9535 | |
| 10,242,019 B1* | 3/2019 | Shan | G06Q 30/02 | |
| 10,255,638 B2* | 4/2019 | Cote | G06Q 40/08 | |
| 10,296,761 B2* | 5/2019 | Jebara | G06F 21/6245 | |
| 10,326,789 B1* | 6/2019 | Vines | H04L 67/02 | |
| 10,395,272 B2* | 8/2019 | Yadagiri | G06Q 30/0251 | |
| 10,397,246 B2* | 8/2019 | Raff | H04L 63/0218 | |
| 10,498,751 B2* | 12/2019 | Yu | H04L 63/1441 | |
| 10,547,674 B2* | 1/2020 | Jerrim | H04L 43/026 | |
| 10,554,684 B2* | 2/2020 | Manthena | G06F 21/602 | |
| 10,558,789 B2* | 2/2020 | Deo | G06F 21/31 | |
| 10,560,537 B2* | 2/2020 | Yamanoha | H04L 67/16 | |
| 10,574,631 B2* | 2/2020 | Robinson | G06F 16/95 | |
| 2005/0028191 A1* | 2/2005 | Sullivan | H04N 5/4401 | 725/28 |
| 2006/0064733 A1* | 3/2006 | Norton | H04N 21/8545 | 725/135 |
| 2006/0242013 A1* | 10/2006 | Agarwal | G06Q 30/0263 | 705/14.49 |
| 2007/0033610 A1* | 2/2007 | Sohn | H04N 21/47 | 725/28 |
| 2007/0143778 A1* | 6/2007 | Covell | G11B 27/28 | 725/19 |
| 2007/0150916 A1* | 6/2007 | Begole | H04N 7/163 | 725/10 |
| 2007/0204288 A1* | 8/2007 | Candelore | H04N 5/4401 | 725/28 |
| 2008/0010291 A1* | 1/2008 | Poola | G06K 9/6219 | |
| 2008/0028467 A1* | 1/2008 | Kommareddy | H04L 63/1458 | 726/23 |
| 2008/0080518 A1* | 4/2008 | Hoeflin | H04L 63/1425 | 370/395.42 |
| 2008/0104113 A1* | 5/2008 | Wong | G06F 16/9535 | |
| 2008/0133349 A1* | 6/2008 | Nazer | G06Q 30/0239 | 705/14.39 |
| 2008/0145025 A1* | 6/2008 | Wimberly | G06F 16/44 | 386/261 |
| 2008/0162227 A1* | 7/2008 | Jakobsson | G06Q 10/06375 | 705/7.37 |
| 2008/0275902 A1* | 11/2008 | Burges | G06K 9/6224 | |
| 2008/0320010 A1* | 12/2008 | Li | G06F 16/9535 | |
| 2009/0006351 A1* | 1/2009 | Stephenson | G06F 16/958 | |
| 2009/0070366 A1* | 3/2009 | Zhao | G06F 16/35 | |
| 2009/0080852 A1* | 3/2009 | Peters | H04N 21/8455 | 386/248 |
| 2009/0089827 A1* | 4/2009 | Carlsgaard | H04N 21/6547 | 725/28 |
| 2009/0089828 A1* | 4/2009 | Carlsgaard | H04N 21/4318 | 725/28 |
| 2009/0265317 A1* | 10/2009 | Buehrer | H04L 47/10 | |
| 2009/0271342 A1* | 10/2009 | Eder | G06Q 50/22 | 706/20 |
| 2009/0313041 A1* | 12/2009 | Eder | G06Q 40/06 | 705/2 |
| 2010/0162396 A1* | 6/2010 | Liu | H04L 63/1425 | 726/23 |
| 2011/0131652 A1* | 6/2011 | Robinson | H04L 63/1408 | 726/22 |
| 2011/0153811 A1* | 6/2011 | Jeong | H04L 63/14 | 709/224 |
| 2011/0154492 A1* | 6/2011 | Jeong | H04L 63/1416 | 726/23 |
| 2011/0167063 A1* | 7/2011 | Tengli | G06F 16/951 | 707/737 |

(56) References Cited

U.S. PATENT DOCUMENTS

| | | | |
|---|---|---|---|
| 2011/0231242 A1* | 9/2011 | Dilling | G06Q 30/0243 705/14.42 |
| 2011/0296179 A1* | 12/2011 | Templin | H04L 9/3236 713/168 |
| 2012/0010867 A1* | 1/2012 | Eder | G16H 50/50 703/13 |
| 2012/0090030 A1* | 4/2012 | Rapaport | G06F 21/552 726/23 |
| 2012/0150641 A1* | 6/2012 | Dobbs | G06Q 30/02 705/14.53 |
| 2012/0150659 A1* | 6/2012 | Patel | G06Q 30/0239 705/14.67 |
| 2012/0158633 A1* | 6/2012 | Eder | G06Q 40/06 706/46 |
| 2012/0215640 A1* | 8/2012 | Ramer | G06Q 30/0269 705/14.55 |
| 2013/0036342 A1* | 2/2013 | Deo | G06F 21/31 715/202 |
| 2013/0066814 A1* | 3/2013 | Bosch | G06F 16/353 706/12 |
| 2013/0085858 A1 | 4/2013 | Sim et al. | |
| 2013/0133072 A1* | 5/2013 | Kraitsman | H04L 63/1425 726/23 |
| 2013/0185750 A1 | 7/2013 | Ayoub | |
| 2013/0218887 A1* | 8/2013 | Yildiz | G06F 15/173 707/736 |
| 2013/0326561 A1* | 12/2013 | Pandey | H04N 9/8042 725/58 |
| 2013/0346202 A1* | 12/2013 | Kouladjie | G06Q 30/06 705/14.55 |
| 2014/0007150 A1* | 1/2014 | Bhide | H04N 21/25891 725/14 |
| 2014/0143825 A1* | 5/2014 | Behrendt | G06F 21/552 726/1 |
| 2014/0157352 A1* | 6/2014 | Paek | H04L 63/1408 726/1 |
| 2014/0165198 A1* | 6/2014 | Altman | H04L 63/1408 726/23 |
| 2014/0180723 A1* | 6/2014 | Cote | G06Q 40/08 705/4 |
| 2014/0244386 A1* | 8/2014 | Mathur | G06Q 30/0255 705/14.53 |
| 2015/0051979 A1* | 2/2015 | Knab | G06Q 30/0269 705/14.66 |
| 2015/0058121 A1* | 2/2015 | Navin | G06Q 30/0255 705/14.53 |
| 2015/0088603 A1* | 3/2015 | Romero | G06Q 30/0201 705/7.29 |
| 2015/0120756 A1* | 4/2015 | Grunick | G06F 16/955 707/748 |
| 2015/0178772 A1 | 6/2015 | Sheth et al. | |
| 2015/0180892 A1* | 6/2015 | Balderas | H04L 61/1511 726/11 |
| 2015/0195291 A1* | 7/2015 | Zuk | H04L 63/168 726/23 |
| 2015/0199432 A1* | 7/2015 | Gailis | G06F 16/951 707/709 |
| 2015/0207783 A1* | 7/2015 | Templin | H04L 9/0869 713/171 |
| 2015/0371281 A1* | 12/2015 | Weinsberg | G06Q 30/0269 705/14.66 |
| 2015/0381637 A1* | 12/2015 | Raff | H04L 63/145 726/23 |
| 2016/0078229 A1* | 3/2016 | Gong | H04L 63/1416 726/24 |
| 2016/0078554 A1* | 3/2016 | Cote | G06Q 40/08 705/4 |
| 2016/0119371 A1* | 4/2016 | Rapaport | H04L 63/126 726/23 |
| 2016/0127413 A1* | 5/2016 | Kraitsman | H04L 63/1408 726/23 |
| 2016/0142428 A1* | 5/2016 | Pastore | H04L 43/08 726/23 |
| 2016/0156655 A1* | 6/2016 | Lotem | H04L 63/1425 726/23 |
| 2016/0205208 A1* | 7/2016 | Yang | H04L 67/22 709/224 |
| 2016/0301764 A1* | 10/2016 | Ruback | G06F 3/04847 |
| 2016/0364771 A1* | 12/2016 | Nielsen | H04L 67/02 |
| 2017/0032412 A1* | 2/2017 | Scharber | G06F 16/24573 |
| 2017/0085583 A1* | 3/2017 | Torres | H04L 63/1408 |
| 2017/0116642 A1* | 4/2017 | Meyer | G06Q 30/0277 |
| 2017/0142158 A1* | 5/2017 | Laoutaris | H04L 67/02 |
| 2017/0195351 A1* | 7/2017 | Turnbull | G06F 21/552 |
| 2017/0237823 A1* | 8/2017 | Pyper | H04L 51/066 709/201 |
| 2017/0243003 A1* | 8/2017 | Rapaport | H04L 63/1416 |
| 2017/0244737 A1* | 8/2017 | Kuperman | G06N 3/04 |
| 2017/0289185 A1* | 10/2017 | Mandyam | H04L 63/0245 |
| 2017/0324772 A1* | 11/2017 | Pastore | G06F 21/554 |
| 2018/0083994 A1* | 3/2018 | Armstrong | H04L 69/22 |
| 2018/0204225 A1* | 7/2018 | Bennefeld | H04L 67/22 |
| 2018/0255106 A1* | 9/2018 | Wiesmaier | H04L 63/205 |
| 2018/0288089 A1* | 10/2018 | Manthena | H04L 67/2847 |
| 2018/0351972 A1* | 12/2018 | Yu | H04L 63/1416 |
| 2019/0028554 A1* | 1/2019 | Yamanoha | H04L 67/16 |
| 2019/0098043 A1* | 3/2019 | Banerjee | H04L 63/1425 |
| 2019/0124160 A1* | 4/2019 | Dhamnani | G06K 9/6277 |
| 2019/0130134 A1* | 5/2019 | Gonzalez Sanchez | G06F 21/6263 |
| 2019/0205991 A1* | 7/2019 | Cote | G07C 5/008 |
| 2019/0222589 A1* | 7/2019 | Kislitsin | H04L 63/1416 |
| 2019/0268305 A1* | 8/2019 | Xu | H04L 63/20 |

OTHER PUBLICATIONS

Golbeck (2013).*
Gray (1999).*
Grier_2005.*
Hayles_2005.*
Krishnan (2015).*
Lanier (2013).*
Malin(2003).*
Mindell_2015.*
Morozov (2011).*
Ohm (2010).*
Pujol (2015).*
Shulte (2015).*
Treffert (2010).*
Turow (2011).*
Chris Hoffman, How-To Geek, The Many Ways Websites Track You Online, Retrieved from: http://www.howtogeek.com/115483/htg-explains-learn-how-websites-are-tracking-you-online/, Sep. 28, 2016, 9 pages.
Facebook © 2020, Ad Targeting, Help your ads find the people who will love your business, Retrieved from internet: https://www.facebook.com/business/products/ads/ad-targeting/, 7 pages.
Lightbeam for Firefox—Mozilla, Retrieved from internet: http://web.archive.org/web/20170601145002/https://www.mozilla, date: May 5, 2020, 3 pages.
Alexis C. Madrigal, Feb. 29, 2012, I'm Being Followed: How Google- and 104 Other Companies—Are Tracking Me on the Web, Retrieved from internet: https://www.theatlantic.com/technology/archive/2012/02/im-being, date: May 5, 2020, 18 pages.
David Talbot, Android App Warns When You're Being Watched, Researchers find a way to give Android users prominent warnings when apps are tracking their location, Retrieved from internet: https://www.technologyreview.com/2014/01/30/174383/android-app-warns-when-youre-being-watched/, date: Jan. 30, 2014, 2 pages.
Andrew Lewis, Collusion, Retrieved from internet: https://web.archive.org/web/20170123195331/http://collusion.tool, date: May 5, 2020, 1 page.

* cited by examiner

US 10,929,878 B2

TARGETED CONTENT IDENTIFICATION AND TRACING

TECHNICAL FIELD

The present invention relates to tracing of computer data or content. More specifically, the invention relates to systems and methods for content identification and tracing sources of content.

BACKGROUND

Today internet users are bombarded with targeted ads and content. Targeted ads and content are provided to users based on past websites visited by the user or past user interactions on websites or internet-connected applications. However, users are provided with no ability to differentiate between targeted ads or content versus non-targeted ads or content. Further, in the case that the ads or content is targeted, users are provided with no ability to determine a source of information used in the targeted ads or content. Thus, improved systems and methods of targeted ads or content identification, along with systems and methods of tracing such ads or content, would be well received in the art.

SUMMARY

An embodiment of the present invention relates to a method, and associated computer system and computer program product, of identifying targeted content. One or more processors of a computer system deploy a plurality of internet bots configured to interact with content sources using predetermined patterns and profiles, wherein each individual internet bot of the plurality of internet bots includes at least one characteristic that is unique relative to the rest of the plurality of internet bots. One or more processors of the computer system collect cause and effect data related to cause and effect of user interactions with content sources. One or more processors of the computer system receive the cause and effect data collected by the plurality of internet bots. One or more processors of the computer system correlate user interactions with content sources using the cause and effect data collected by the plurality of internet bots. Further, one or more processors of the computer system identify how content is targeted to users by content sources from the correlating.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention improves and optimizes systems for content identification. The present invention recognizes that internet users are bombarded with targeted content every day with little ability to differentiate such content with non-targeted content. Further, the present invention recognizes that users have no way of determining the sources of information used in targeting. The present invention thus provides systems and methods for accomplishing that which was previously not possible—the identification of targeted content, and the tracing of such content to a targeted source. These methods and systems provide users with functionality not possible using existing technology. In particular, existing technology provides no way to accurately identify targeted content and discern or otherwise trace the source of targeted content.

Further, embodiments of the present invention recognize that the manner in which the methods described herein are performed are not equivalent to the manner in which those same tasks would be performed via human interaction. Human interaction would be incapable of tracing the sources of information for all targeted content and advertising received—both because of the sheer volume of targeted content, and because there is no way for a human to trace back targeted content to its content source. Embodiments of the present invention operate, at least in part, independently of human interaction, such as in the collection, receiving and correlating of user interaction information with content sources.

Figure 1:
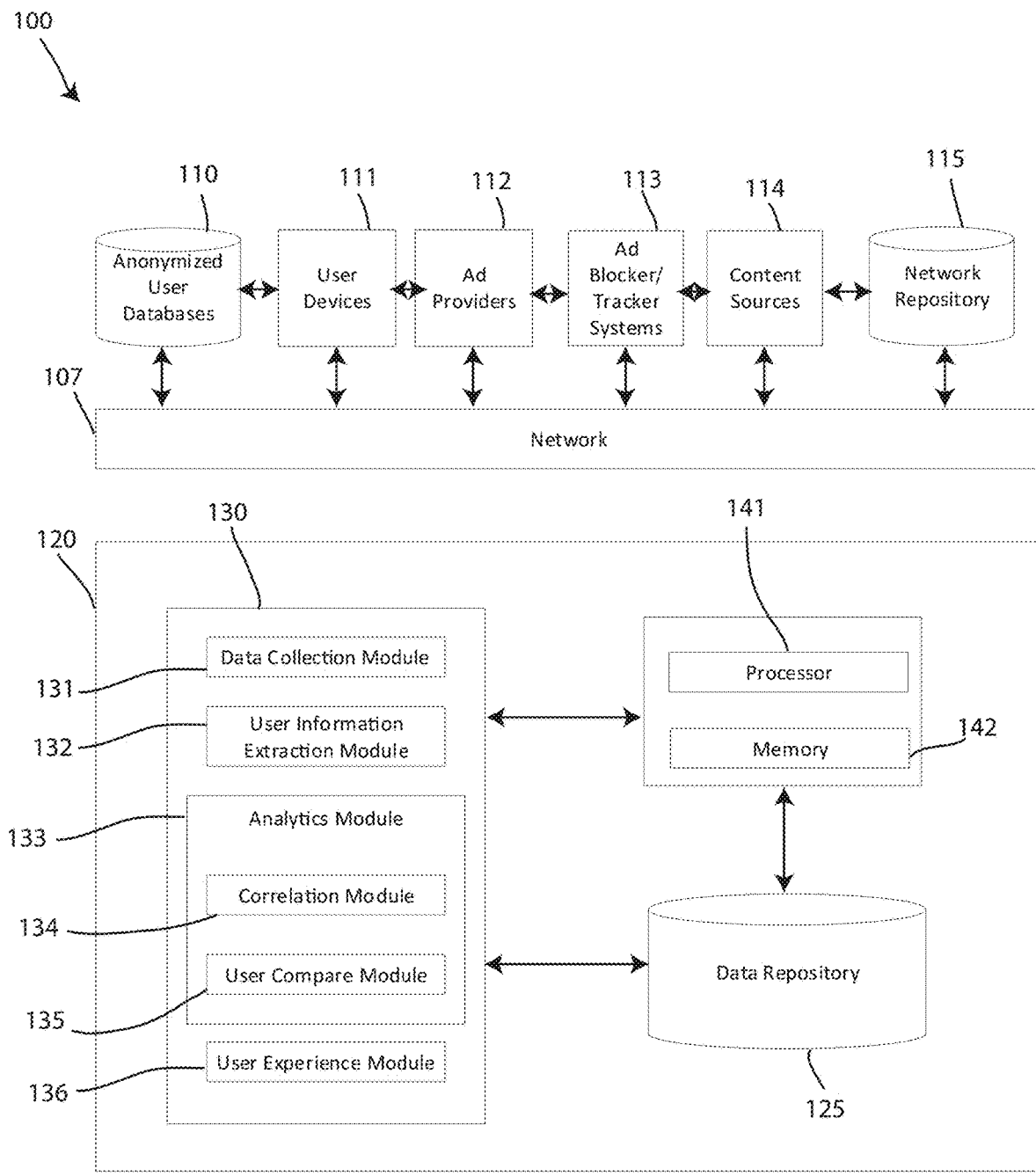
FIG. 1 depicts a block diagram of a system for targeted content identification, in accordance with embodiments of the present invention.

Referring to the drawings, FIG. 1 depicts a block diagram of a system for targeted content identification 100, in accordance with embodiments of the present invention. Embodiments of a system for targeted content identification 100 may include the ability to perform various functionality in addition to targeted content identification. For example, the system for targeted content identification 100 may be configured to collect cause and effect data related to cause and effect of user interactions with content sources. The system for targeted content identification 100 may be configured to correlate user interactions with content sources using collected cause and effect data. The system for targeted content identification may be configured to identify how content is targeted to users by content sources, and trace content provided to the specific user as a result of the specific user activity to a content source. Various functionality of the system for targeted content identification 100 are described herein below, and it should be understood that the invention is not limited to only performing targeted content identification and may be configured to provide any of the various functionality described herein.

The system for targeted content identification 100 may include anonymized user databases 110, user devices 111, ad providers 112, ad blocker or tracker systems 113, content sources 114, and one or more network repositories 115 connected over a network 107 to a computer system 120. Some or all of the anonymized user databases 110, user devices 111, ad providers 112, ad blocker and/or tracker systems 113, content sources 114, and one or more network repositories 115 may be interconnected to others of these devices. While FIG. 1 shows the anonymized user databases 110, user devices 111, ad providers 112, ad blocker and/or tracker systems 113, content sources 114 and one or more network repositories 115 directly connected to adjacent elements 110, 111, 112, 113, 114, 115, any interconnection of elements 110, 111, 112, 113, 114, 115. Further, while each of the elements 110, 111, 112, 113, 114, 115 are shown as separate features of the system for targeted content identification 100, in some embodiments one or more of the elements 110, 111, 112, 113, 114, 115 may be combined or overlap.

The anonymized user databases 110 may be one or more repositories for collecting user data provided in anonymity. For example, a user may provide access to one or more social media profiles of the user. This voluntarily provided user information may be stored in the anonymized user databases 110. These user databases may be owned and operated by the same entity that controls the computer system 120 in one embodiment. In another embodiment computer system 120 may be configured to subscribe, obtain or otherwise collect information from anatomized user databases 110 that has been collected by user consent. The anonymized user databases 110 may be stored within a database or repository of the computer system 120, in still other embodiments.

The user devices 111 may be any device that a user connects to content sources. For example, user devices 111 may be a personal computer, a desktop computer, a laptop computer, a mobile communicator such as a mobile phone, a tablet, a personal digital assistant device, a wearable device such as a watch, a media storage device, an image capture device, a display device, or any other device connectable to the network 107 and the computer system 120 that is owned and/or operated by a user. The user devices 111 may include the device of a user that is utilizing the computer system 120 to identify and trace targeted content to content sources. The user devices 111 may also include the devices of users that have provided information utilized by the computer system 120 in the correlating, identifying and tracing described below.

The ad providers 112 may collect data voluntarily provided by users. For example, advertisement providers that are members of the Digital Advertising Alliance (DAA) may voluntarily provide information on their target ads. Such voluntarily provided information, when made public by ad providers, may be provided to the computer system 120 for use in the analysis, correlation, tracing, and identification in accordance with methods and functionality of the computer system 120 described herein below.

The ad blocker and/or tracker systems 113 may further generate or collect information related to the content and sources of advertisements. For example, ad blocking and/or tracking systems such as AdBlock Plus, Ghostery®, Privacy Badger, Lightbeam, and the like may track cookies and other interactions at the browser level to identify and classify third party trackers. This tracked information may be collected, requested or otherwise obtained by the computer system 120 for use in the analysis, correlation, tracing, and identification in accordance with methods and functionality of the computer system 120 described herein below.

The content sources 114 themselves may further be connected to the system for targeted content identification 100. The content sources 114 may be, for example, social media platforms like Facebook®, Instagram®, Twitter® or the like. The content sources 114 may be web-based user mail applications such as google Gmail®, Hotmail®, or search engines like Google®, or Bing®. The content sources 114 may be websites or user interfaces owned and operated by product or service providers. The content sources 114 may be digital marketplaces such as Amazon®, Ebay® or the like. The content sources 114 may be digital entertainment platforms connectable to the internet, such as digital games, digital media sources (news or information content sources, or the like). Thus, content sources 114 as contemplated herein may be any source of content connected to the internet that a user may experience or interact with.

The network repository 115 may be a data collection area on the network 107 which may back up and save all the data transmitted back and forth between the nodes of the network 107. For example, the network repository 115 may be a data center saving and cataloging user data sent by the user devices 111, ad providers 112, ad blocker and/or tracker systems 113, content sources 114, or the like. The network repository 115 may use this data to generate databases related to the information received. In some embodiments, a data collection center housing the network repository 115 may include an analytic module capable of analyzing each piece of data being stored by the network repository 115. Further, the computer system 120 may be integrated with or may be a component of the data collection center housing the network repository 115. In some alternative embodiments, the network repository 115 may be a local repository that is connected to the computer system 120.

The network 107 may be any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture. The computer system 120 is shown connected to the anonymized user databases 110, user devices 111, ad providers 112, ad blocker or tracker systems 113, content sources 114 and one or more network repositories 115 via the network 107.

Embodiments of the computer system 120 may include a data collection module 131, a user information extraction module 132, an analytics module 133, a correlation module 134, a user compare module 135, and a user experience module 136. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the data collection module 131 may include one or more components of hardware and/or software program code for obtaining, retrieving, collecting, or otherwise acquiring information from the various elements 110, 111, 112, 113, 114, 115 of the system for targeted content identification 100. Thus, the data collection module 131 may be connected to the above described elements 110, 111, 112, 113, 114, 115 and may be configured to receive information from these elements. In some embodiments, the data collection module 131 may be configured to automatically scrape or otherwise procure publicly available information from one or more of the elements 110, 111, 112, 113, 114, 115. In other embodiments, the data collection module 131 may be configured to obtain consent from the elements 110, 111, 112, 113, 114, 115 from which the data collection module 131 collects data.

The data collection module 131 may further be configured to deploy a plurality of internet bots configured to interact with the content sources 114 using predetermined patterns and/or profiles. Each of the individual internet bots deployed may have one or more characteristics that are unique relative to the others of the internet bots deployed by the collection module 131. Using these unique internet bots, the data collection module 131 may be configured to browse content sources 114 with specific browsing patterns, such as for example browsing specific categories of products or specific products. The internet bots may be considered digital agents of the data collection module 131. The internet bots may be configured to monitor and track information being applied using tracking techniques such as IP address, HTTP referrer, cookies, tracking scripts, and the like. The browsing patterns to which the internet bots are deployed to perform may be updated by the computer system 120 as the analytics module 133 may mandate. For example, if the analytics module 133 (described below) determines that gaps exist in a dataset, the data collection module 131 may be directed to deploy the internet bots with predetermined browsing patterns to collect information to fill such data gaps. The data collection module 131 may be constantly updating in this manner using feedback provided by the analytics module 133. The data collection module 131 may be configured to store all collected information in a database or repository, such as the data repository 125.

Embodiments of the user information extraction module 132 may include one or more components of hardware and/or software program code for extracting user activity from a specific user using, for example, the user devices 111. For example, the information extraction module 132 may be configured to extract information about a given specific user. A specific user may be a user that desires to determine, identify, or trace targeted content to a content source. Information extracted by the extraction module 132 from the specific user may include data related to social media profiles, browsing history, and cookies stored on a user device 111 of the specific user.

In one embodiment, the user information extraction module 132 may include a browser extension that is downloadable by the specific user onto the user device of the specific user. Thus, the user information extraction module 132 may include functionality that is located on the user device 111 directly and interfaces with, or adds-on to, an internet browser. In this embodiment, the user information extraction module 132 may include an interface located within the computer system 120 for connecting to the browser extension to receive information collected by the browser extension. Whatever the embodiment, the user information extraction module 132 may be configured to gather data for use by the analytics module 133, as described herein below. The user information extraction module 132 may be configured to store all collected information in a database or repository, such as the data repository 125.

Embodiments of the analytics module 133 may include one or more components of hardware and/or software program code for analyzing information collected by the user information extraction module 132 and the data collection module 131. The analytics module 133 may be configured to continually analyze, interpret, evaluate, etc., the data received and make determinations based on the analysis. The analytics module 133 may be configured to analyze the data received to determine whether there are any gaps in the information received that preclude or reduce the accuracy of other determinations made by the analytics module 133. The analytics module 133 may be configured to direct the internet bots of the data collection module 131 based on this analysis.

The analytics module 133 may be configured to correlate user interactions with content sources using collected cause and effect data collected by the internet bots of the data collection module 131. The analytics module 133 may be configured to identify from this correlating how content is targeted to users by content sources. The analytics module 133 may be configured to trace content provided to a specific user as a result of specific user activity back to a content source interacted with by the specific user. The analytics module 133 may include two specific sub modules for making these specific determinations: the correlation module 134 and the user compare module 135.

Embodiments of the correlation module 134 may include one or more components of hardware and/or software program code for correlating user interactions with the content sources 114 using cause and effect data collected by the data collection module 131 by, for example, the plurality of internet bots. The correlation module 134 may further be configured to use the data collected from the anonymized user databases 110, the ad providers 112, and the ad blocker and/or tracker systems 113 in the correlating process. The correlation module 134 may be configured to utilize cognitive analytics to use the collected information to predict cause and effect relationships of content and/or ads that are observed. Information from all of the data sources 110, 112, 113, 114 may be utilized by the correlation module 134 to achieve an accurate representation of what actions (e.g. social media activity or web browsing) by users might cause targeted content such as targeted ads. The correlation engine 134 may be configured to learn and/or adapt over time in as more information is collected from the data sources 110, 112, 113, 114. The correlation module 134 may be configured to provide a weighted likeliness score related to the determinations made by the correlation module 134. The correlation module 134 may be configured to build a correlation map of relationships between user activity and targeted content and/or advertisements. Thus, the data collection module 131 and the user information extraction module 132 may be constantly providing new information to the correlation module 134 as new information is received from the information sources 110, 112, 113, 114 in real time, and this information is correlated in real time to maintain an up-to-date correlation map of these relationships. The correlation module 134 may further be configured to store correlated data such as the correlation map in a data repository or other database, such as the data repository 125. This stored correlation information may be utilized by the user compare module 135 for making specific user related determinations of advertisements or other content provided to a specific user.

Embodiments of the user compare module 135 may include one or more components of hardware and/or software program code for comparing the specific activities of a user against the correlated user interactions determined by the correlation module 134, and for example, stored in the data repository 125, such as in the form of a correlation map. The user compare module 135 may be configured to trace content provided to the specific user as a result of the specific user activity to a content source, based on the comparing. The user compare module 135 may be configured to retrieve information stored by the correlation module 134 in order to utilize this processed information in performing specific user comparisons.

The correlation module 134 may be thus configured to analyze and organize generalized data received from a plurality of data sources 110, 112, 113, 114, process this received data into useful correlated data such as correlation maps, and store this data as it is processed in real time for use by the user compare module 135. The user compare module 135 may be configured to perform specific comparisons based on specific user activity of a specific user that is connected or otherwise interacting with the computer system 120. Thus, the user compare module 135 may be configured to utilize the generalized information collected and correlated, and perform specific determinations and traces based on this information related to specific user activity.

The user compare module 135 may be configured to determine an accuracy weight associated with the determination. For example, it may be that the user compare module 135 may be configured to determine that it is 90% likely that a particular content source was responsible for targeted content. This determination may be provided to the user via the user experience module 136.

Embodiments of the user experience module 136 may include one or more components of hardware and/or software program code for providing notifications to a specific user that is connected to or otherwise interacting with the computer system 120 that has been subject to content deriving from a content source. The user experience module 136 may be configured to provide such notifications based on the comparing by the user compare module 135 between the specific user activity against the correlated user interactions. The user experience module 136 may be configured to provide an option to a specific user, for example, to view whether the content source is targeted content (vs. non targeted content that is provided to every user). The user experience module 136 may be configured to provide the user with an option to view which particular content source has been determined to be the source of the targeted content, if in fact the content is targeted. The user experience module 136 may further be configured to provide a measure of the accuracy of the likeliness of the source of the targeted content. In various embodiments, the user experience module 136 may include a portion that is downloaded and operating on the specific user device 111 of the specific user. For example, the browser extension may include a portion of the user experience module 136 for providing the above-described user experience in one or more browsers used by the specific user.

Referring still to FIG. 1, embodiments of the computer system 120 may be equipped with a memory device 142 which may store the information related to the data center 110 and/or the battery system 111 thereof. The computer system 120 may further be equipped with a processor 141 for implementing the tasks associated with the system for content identification 100.

Figure 2:
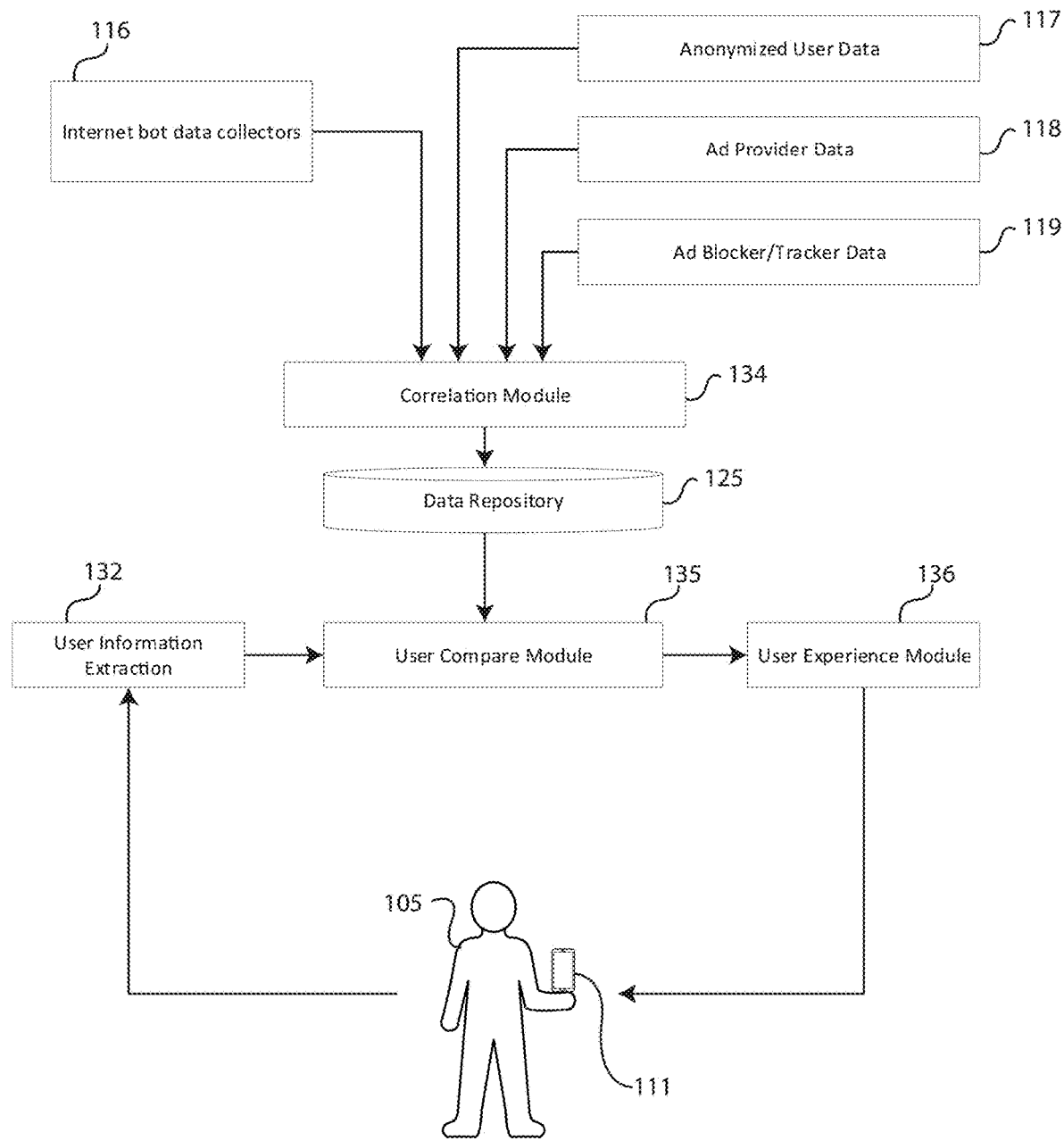
FIG. 2 depicts a data flow block diagram of a portion of the system of FIG. 1, in accordance with embodiments of the present invention.

FIG. 2 depicts a data flow block diagram of a portion of the system of FIG. 1, in accordance with embodiments of the present invention. As shown, data from internet bot data collectors 116 of the data collection module 131, anonymized user data 117 from the anonymized user databases 110, ad provider data 118 from the ad providers 112, and ad blocker and/or tracker data 119 from the ad block and/or tracker systems 113 may be received or collected by the data collection module 131 and provided to the correlation module 134 for analytics, as described above. The correlation module 134 may store processed and correlated information, such as in the form of a correlation map, related to cause and effect of user interactions with content source and targeted content. The correlation module 134 may be configured to store this correlated information in the data repository 125 of the computer system 120.

In the lower data flow portion of the data flow block diagram of FIG. 2, a user 105 is using a user device 105. The user information extraction module 132 is extracting information from the usage of the user 105. The user information extraction module 132 provides this extracted information to the user compare module 135. The user compare module 135 retrieves or otherwise receives correlation information from the data repository 125 relative to the specific user interaction of the user 105. The user compare module 135 uses the extracted user information from the user extraction module 132 and the correlated data from the data repository 125 to make targeting, tracing, and content source determinations. The user compare module 135 then provides these determinations and information to the user experience module 136 which provides this information to the user device 111 of the user using, for example, a browser extension.

Figure 3:
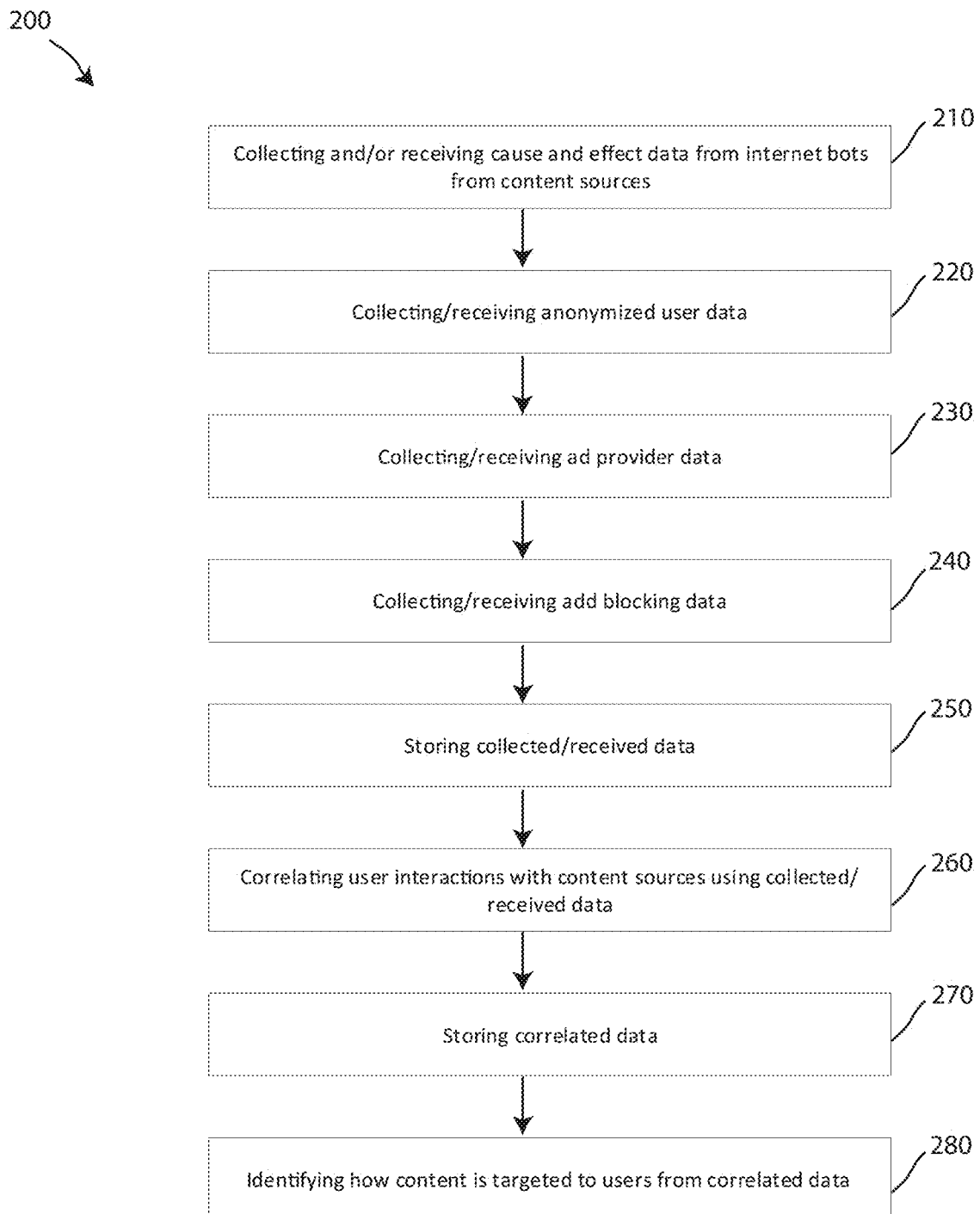
FIG. 3 depicts a flow chart of a method for targeted content identification, in accordance with embodiments of the present invention.

FIG. 3 depicts a flow chart of a method for targeted content identification 200, in accordance with embodiments of the present invention. The method 200 may include a first step 210 of collecting and/or receiving cause and effect data related to user interactions with content sources, from internet bots interacting with content sources. For example, the method 200 may include deploying, by one or more processors of a computer system such as the computer system 120, a plurality of internet bots configured to interact with content sources using predetermined patterns and profiles. Each individual internet bot of the plurality of internet bots may include at least one characteristic that is unique relative to the rest of the plurality of internet bots. The method 200 may further include a step 220 of collecting and/or receiving, by the one or more processors of the computer system, anonymized user data. The method may include a step 230 of collecting and/or receiving, by the one or more processors of the computer system, information voluntarily provided by content providers. The method 200 may include a step 240 of collecting and/or receiving, by the one or more processors of the computer system, ad blocking or tracking system data. The method 200 may include a step 250 of storing collected and/or received data, by the one or more processors of the computer system. The method 200 may include a step 260 of correlating, by the one or more processors of the computer system, user interactions with content sources using the cause and effect data collected by the plurality of internet bots. The method 200 may include a step 270 of storing the correlated data. The method 200 may include a step 280 of identifying, by the one or more processors of the computer system, how content is targeted to users by content sources from the correlating.

Figure 4:
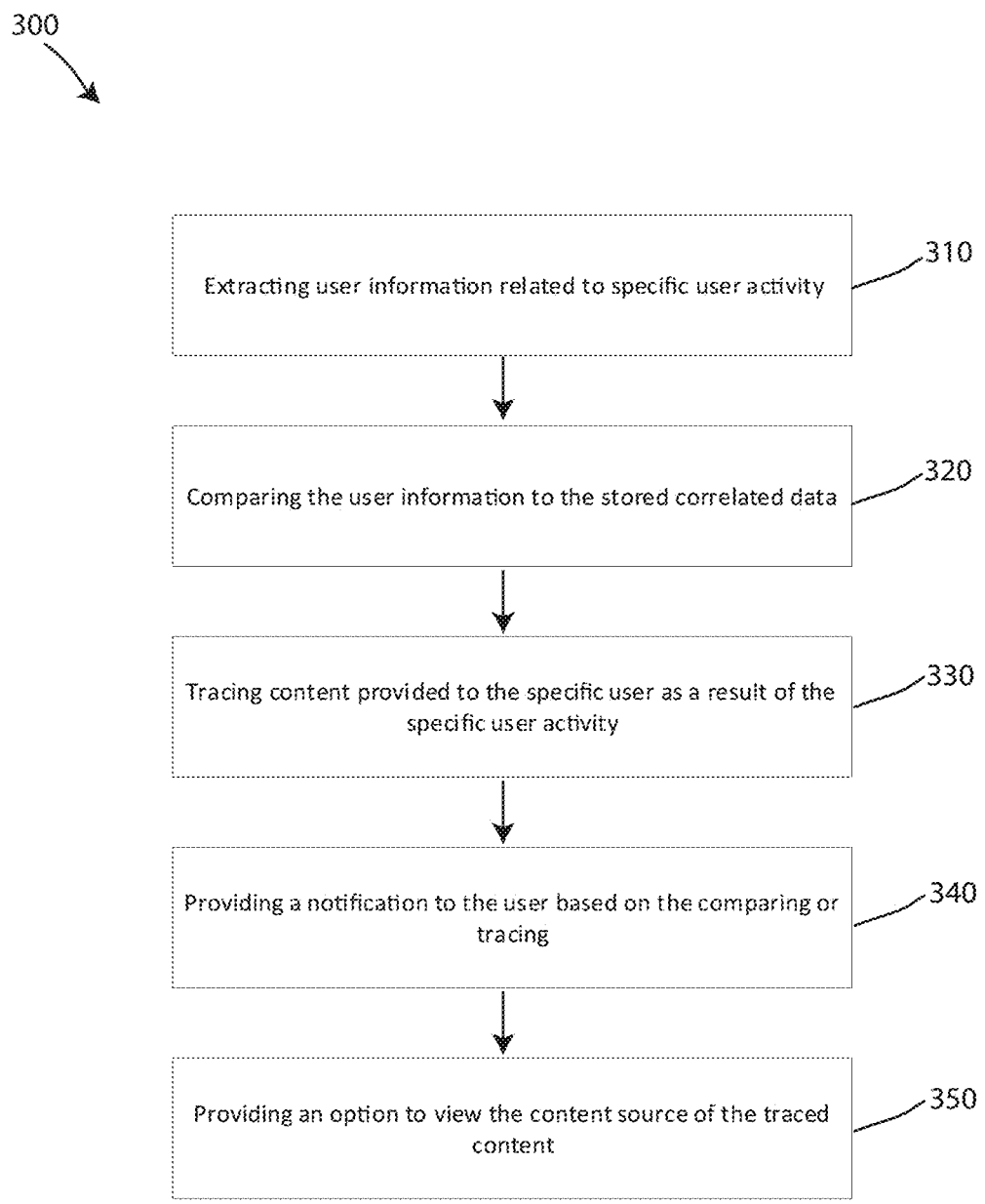
FIG. 4 depicts a flow chart of a method for targeted content identification, in accordance with embodiments of the present invention.

FIG. 4 depicts a flow chart of a method 300 for targeted content identification 300, in accordance with embodiments of the present invention. The method 300 may be an additional portion of the method 200 of FIG. 3. In other embodiments, the method 300 of FIG. 4 may be separate and independent from the methodology shown in FIG. 3. The method 300 may include a first step 310 of extracting, by the one or more processors of the computer system, a specific user activity from a specific user. The method 300 may include a step 320 of comparing, by the one or more processors of the computer system, the specific user activity against the correlated user interactions. The method 300 may include a step 330 of tracing, by the one or more processors of the computer system, content provided to the specific user as a result of the specific user activity to a content source from the comparing. The method 300 may further include a step 340 of providing, by the one or more processors of the computer system, a notification to the specific user based on at least one of the comparing and tracing. The method 300 may include a step 350 of providing, by the one or more processors of the computer system, an option to view the content source or whether the content is targeted content.

The systems and methods described herein above improve the art web browsers and web browser add-ons or more specifically of internet based content or advertisement source identification and tracing. In particular, prior to the present invention, the art has not developed a two-module approach that utilizes: A) a correlation module which pre-processes vast amounts of data related to content sources; and B) a user compare module which processes user-specific information by comparing with the correlated data. Further, the present invention improves the art by providing a mechanism for holistically processing and correlating data from a number of different sources including internet bot data collectors, anonymized user data sources, ad provider data sources and ad blocker and/or tracker data sources. The present invention improves the art by creating a database of correlated data that has already been processed, which makes it possible to quickly determine content sources based on specific user interactions. Specifically, by creating a database of correlated data, the present invention enables specific user information to be processed and compared to already-correlated data to provide specific targeted content identification and source tracing—a result which was not possible with prior art techniques. Still further the present invention provides an improved and unique user experience based on the new results achieved in targeted content identification and tracing.

Figure 5:
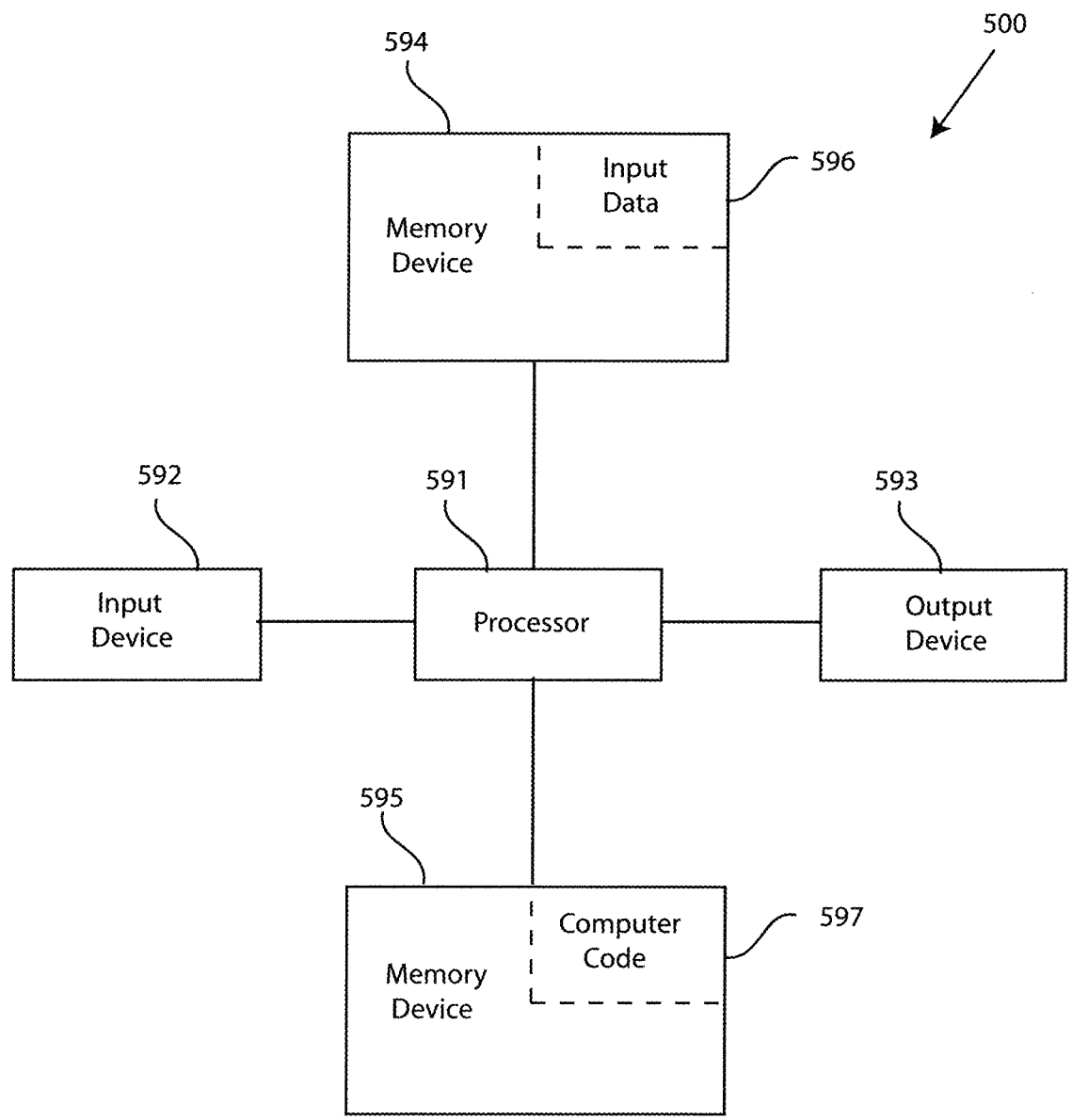
FIG. 5 depicts a block diagram of a computer system for targeted content identification of FIGS. 1-2, capable of implementing methods for targeted content identification of FIGS. 3-4, in accordance with embodiments of the present invention.

FIG. 5 illustrates a block diagram of a computer system that may representative of any computer or computer system within the system for targeted content identification of FIGS. 1-2, capable of implementing methods for targeted content identification of FIGS. 3-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for targeted content identification, in the manner prescribed by the embodiments of FIGS. 3-4 using the system for targeted content identification of FIGS. 1-2, wherein the instructions of the computer code 597 may be executed by processor 591 via memory device 595. The computer code 597 may include software or program instructions that may implement one or more algorithms for implementing the methods for targeted content identification, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Figure 6:
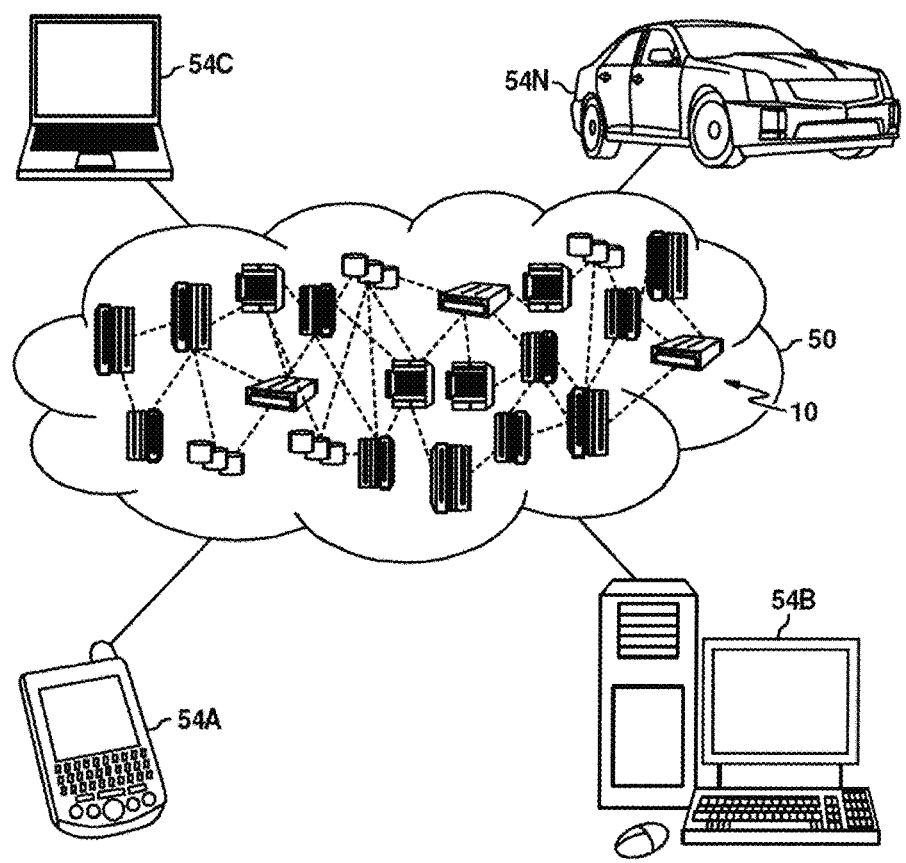
FIG. 6 depicts a cloud computing environment, in accordance with embodiments of the present invention.

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for targeted content identification. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for targeted content identification. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for targeted content identification. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for targeted content identification.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
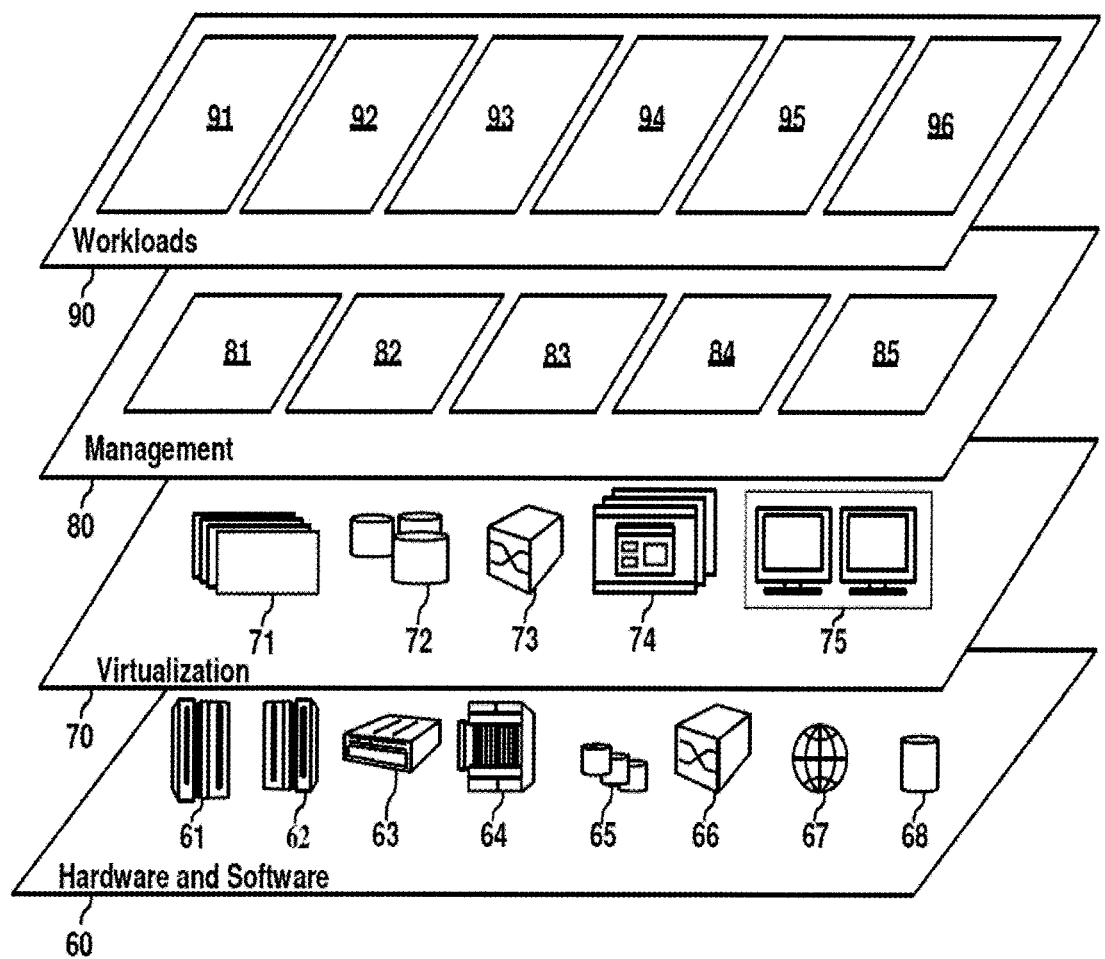
FIG. 7 depicts abstraction model layers, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (see FIG. 7) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to targeted content identification 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of identifying targeted content, the method comprising:

deploying, by one or more processors of a computer system, a plurality of internet bots configured to interact with content sources using predetermined patterns and profiles, wherein each individual internet bot of the plurality of internet bots includes at least one characteristic that is unique relative to the rest of the plurality of internet bots;

collecting, by the plurality of internet bots, cause and effect data related to cause and effect of user interactions with content sources;

receiving, by the one or more processors of the computer system, the cause and effect data collected by the plurality of internet bots;

correlating, by the one or more processors of the computer system, user interactions with content sources using the cause and effect data collected by the plurality of internet bots utilizing cognitive analytics;

predicting, by the one or more processors of the computer system, cause and effect relationships of new content observed by a user;

adapting over time, by the one or more processors of the computer system, the predicting as more cause and effect data is collected;

identifying, by the one or more processors of the computer system, how content is targeted to users by content sources from the correlating; and providing to a user, by the one or more processors of the computer system, a likeliness metric of how likely content comes from a particular content source.

2. The method of claim 1, further comprising:
receiving, by the one or more processors of the computer system, at least one of anonymized user data and information voluntarily provided by content providers; and
using, by the one or more processors of the computer system, the at least one of anonymized user data and information voluntarily provided by content providers in the correlating.

3. The method of claim 1, further comprising:
receiving, by the one or more processors of the computer system, ad blocking or tracking system data; and
using, by the one or more processors of the computer system, the ad blocking or tracking system data in the correlating.

4. The method of claim 1, further comprising:
extracting, by the one or more processors of the computer system, a specific user activity from a specific user;
comparing, by the one or more processors of the computer system, the specific user activity against the correlated user interactions; and
tracing, by the one or more processors of the computer system, content provided to the specific user as a result of the specific user activity to a content source from the comparing.

5. The method of claim 4, further comprising:
storing, by the one or more processors of the computer system, correlated user interaction and content source data, the correlated user interaction and content source data resulting from the correlating; and
using, by the one or more processors of the computer system, the stored correlated user interaction and content source data in the comparing.

6. The method of claim 5, further comprising:
providing, by the one or more processors of the computer system, a notification to the specific user based on at least one of the comparing and tracing; and
providing, by the one or more processors of the computer system, an option to view the content source or whether the content is targeted content.

7. The method of claim 1, further comprising:
building, by the one or more processors of the computer system, a correlation map of relationships between user interactions and targeted content; and
storing, by the one or more processors of the computer system, the correlation map in a data repository and maintaining the correlation map up to date in real time as new cause and effect data is received.

8. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method of identifying targeted content, the method comprising:
deploying, by the one or more processors of the computer system, a plurality of internet bots configured to interact with content sources using predetermined patterns and profiles, wherein each individual internet bot of the plurality of internet bots includes at least one characteristic that is unique relative to the rest of the plurality of internet bots utilizing cognitive analytics;
collecting, by the plurality of internet bots, cause and effect data related to cause and effect of user interactions with content sources;
receiving, by the one or more processors of the computer system, the cause and effect data collected by the plurality of internet bots;
correlating, by the one or more processors of the computer system, user interactions with content sources using the cause and effect data collected by the plurality of internet bots;
predicting, by the one or more processors of the computer system, cause and effect relationships of new content observed by a user;
adapting over time, by the one or more processors of the computer system, the predicting as more cause and effect data is collected;
identifying, by the one or more processors of the computer system, how content is targeted to users by content sources from the correlating; and
providing to a user, by the one or more processors of the computer system, a likeliness metric of how likely content comes from a particular content source.

9. The computer system of claim 8, the method further comprising:
receiving, by the one or more processors of the computer system, at least one of anonymized user data and information voluntarily provided by content providers; and
using, by the one or more processors of the computer system, the at least one of anonymized user data and information voluntarily provided by content providers in the correlating.

10. The computer system of claim 8, the method further comprising:
receiving, by the one or more processors of the computer system, ad blocking or tracking system data; and
using, by the one or more processors of the computer system, the ad blocking or tracking system data in the correlating.

11. The computer system of claim 8, the method further comprising:
extracting, by the one or more processors of the computer system, a specific user activity from a specific user;
comparing, by the one or more processors of the computer system, the specific user activity against the correlated user interactions; and
tracing, by the one or more processors of the computer system, content provided to the specific user as a result of the specific user activity to a content source from the comparing.

12. The computer system of claim 11, the method further comprising:
storing, by the one or more processors of the computer system, correlated user interaction and content source data, the correlated user interaction and content source data resulting from the correlating; and
using, by the one or more processors of the computer system, the stored correlated user interaction and content source data in the comparing.

13. The computer system of claim 11, method further comprising:
providing, by the one or more processors of the computer system, a notification to the specific user based on at least one of the comparing and tracing; and providing, by the one or more processors of the computer system, an option to view the content source or whether the content is targeted content.

14. The computer system of claim 8, the method further comprising:
building, by the one or more processors of the computer system, a correlation map of relationships between user interactions and targeted content; and
storing, by the one or more processors of the computer system, the correlation map in a data repository and maintaining the correlation map up to date in real time as new cause and effect data is received.

15. A computer program product, comprising a computer readable hardware storage device storing a computer readable program code, the computer readable program code comprising an algorithm that when executed by one or more processors of a computer system implements a method of identifying targeted content, the method comprising:
deploying, by the one or more processors of the computer system, a plurality of internet bots configured to interact with content sources using predetermined patterns and profiles, wherein each individual internet bot of the plurality of internet bots includes at least one characteristic that is unique relative to the rest of the plurality of internet bots utilizing cognitive analytics;
collecting, by the plurality of internet bots, cause and effect data related to cause and effect of user interactions with content sources;
receiving, by the one or more processors of the computer system, the cause and effect data collected by the plurality of internet bots;
correlating, by the one or more processors of the computer system, user interactions with content sources using the cause and effect data collected by the plurality of internet bots;
predicting, by the one or more processors of the computer system, cause and effect relationships of new content observed by a user;
adapting over time, by the one or more processors of the computer system, the predicting as more cause and effect data is collected;
identifying, by the one or more processors of the computer system, how content is targeted to users by content sources from the correlating; and
providing to a user, by the one or more processors of the computer system, a likeliness metric of how likely content comes from a particular content source.

16. The computer program product of claim 15, the method further comprising:
receiving, by the one or more processors of the computer system, at least one of anonymized user data and information voluntarily provided by content providers; and
using, by the one or more processors of the computer system, the at least one of anonymized user data and information voluntarily provided by content providers in the correlating.

17. The computer program product of claim 15, the method further comprising:
receiving, by the one or more processors of the computer system, ad blocking or tracking system data; and
using, by the one or more processors of the computer system, the ad blocking or tracking system data in the correlating.

18. The computer program product of claim 15, the method further comprising:
extracting, by the one or more processors of the computer system, a specific user activity from a specific user;
comparing, by the one or more processors of the computer system, the specific user activity against the correlated user interactions; and
tracing, by the one or more processors of the computer system, content provided to the specific user as a result of the specific user activity to a content source from the comparing.

19. The computer program product of claim 18, the method further comprising:
storing, by the one or more processors of the computer system, correlated user interaction and content source data, the correlated user interaction and content source data resulting from the correlating; and
using, by the one or more processors of the computer system, the stored correlated user interaction and content source data in the comparing.

20. The computer program product of claim 15, the method further comprising:
building, by the one or more processors of the computer system, a correlation map of relationships between user interactions and targeted content; and
storing, by the one or more processors of the computer system, the correlation map in a data repository and maintaining the correlation map up to date in real time as new cause and effect data is received.

* * * * *